US010187774B2

(12) United States Patent
Ganton et al.

(10) Patent No.: US 10,187,774 B2
(45) Date of Patent: Jan. 22, 2019

(54) METHOD TO IMPROVE CONNECTIVITY TO A WIRELESS LOW ENERGY PERIPHERAL DEVICE WHEN BEING ACCESSED BY MULTIPLE CENTRAL DEVICES

(71) Applicant: QUALCOMM Incorporated, San Diego, CA (US)

(72) Inventors: Robert Ganton, San Diego, CA (US); John Earl Amschler, San Deigo, CA (US)

(73) Assignee: QUALCOMM Incorporated, San Diego, CA (US)

(*) Notice: Subject to any disclaimer, the term of this patent is extended or adjusted under 35 U.S.C. 154(b) by 0 days.

(21) Appl. No.: 15/898,079

(22) Filed: Feb. 15, 2018

(65) Prior Publication Data

US 2018/0242130 A1    Aug. 23, 2018

Related U.S. Application Data

(60) Provisional application No. 62/460,683, filed on Feb. 17, 2017.

(51) Int. Cl.
*H04W 4/06*    (2009.01)
*H04W 4/80*    (2018.01)
*H04L 29/08*   (2006.01)
*H04W 76/00*   (2018.01)
*H04W 76/15*   (2018.01)

(52) U.S. Cl.
CPC .............. *H04W 4/80* (2018.02); *H04L 67/12* (2013.01); *H04W 4/06* (2013.01); *H04W 76/00* (2013.01); *H04W 76/15* (2018.02)

(58) Field of Classification Search
CPC ......... H04W 4/80; H04W 76/15; H04W 4/06; H04W 76/00; H04L 67/12
See application file for complete search history.

(56) References Cited

U.S. PATENT DOCUMENTS

| 8,442,437 | B1 | 5/2013 | Beard et al. |
| 8,994,509 | B2 | 3/2015 | Gottlich |
| 9,066,327 | B2 | 6/2015 | Liu |
| 9,173,053 | B2 | 10/2015 | Holman et al. |
| 9,363,628 | B2 | 6/2016 | Viswanadham et al. |
| 2014/0179233 | A1* | 6/2014 | Kang ............... H04L 67/16 455/41.2 |
| 2015/0245194 | A1 | 8/2015 | Kim et al. |

(Continued)

FOREIGN PATENT DOCUMENTS

| EP | 2884776 A2 | 6/2015 |
| EP | 3125641 A1 | 2/2017 |
| WO | 2016007187 A1 | 1/2016 |

OTHER PUBLICATIONS

International Search Report and Written Opinion—PCT/US2018/018487—ISA/EPO—dated May 24, 2018.

*Primary Examiner* — Nguyen T Vo
(74) *Attorney, Agent, or Firm* — Kilpatrick Townsend & Stockton/Qualcomm (57) ABSTRACT

A peripheral device can connect with a desired central device by broadcasting advertisement packets with specialized data flags, which may be located in certain data fields. This can increase the probability that the peripheral device will connect with the desired central device by enabling other central devices to ignore these advertisement packets.

30 Claims, 5 Drawing Sheets

(56) References Cited

U.S. PATENT DOCUMENTS

| | | |
|---|---|---|
| 2016/0095047 A1 | 3/2016 | Lee et al. |
| 2017/0034856 A1 | 2/2017 | Takeuchi et al. |
| 2017/0048911 A1 | 2/2017 | Ge et al. |
| 2017/0099597 A1 | 4/2017 | Choi et al. |
| 2017/0187828 A1* | 6/2017 | Soji ...................... H04L 67/325 |

* cited by examiner

120
METHOD TO IMPROVE CONNECTIVITY TO A WIRELESS LOW ENERGY PERIPHERAL DEVICE WHEN BEING ACCESSED BY MULTIPLE CENTRAL DEVICES

RELATED APPLICATIONS

This application claims the benefit of U.S. Provisional Application No. 62/460,683, filed Feb. 17, 2017, entitled "A METHOD TO IMPROVE CONNECTIVITY TO A BLUETOOTH LOW ENERGY PERIPHERAL DEVICE WHEN BEING ACCESSED BY MULTIPLE CENTRAL DEVICES", which is assigned to the assignee hereof, and incorporated by reference herein in its entirety.

BACKGROUND

Medical devices for home use by a patient have recently become modified to track and report related usage data, which can be sent wirelessly to, for example, a smart phone of a user. Wireless technologies used to convey this data, such as Bluetooth® Low Energy (BLE), may create a central/peripheral relationship where the mobile device is the central device and the medical device is the peripheral device.

The central/peripheral relationship between these devices can prevent other devices from connecting with the medical device. This can present an issue when, for example, a health care provider attempts to connect a device to the medical device (e.g., to extract data from the medical device). For instance, if the patient's mobile device is nearby, it may prevent the device of the health care provider from connecting with the medical device.

SUMMARY

Techniques provided herein address these connectivity issues by enabling a peripheral device (e.g., a medical device) to connect with a desired central device (e.g., a healthcare provider's device) by broadcasting advertisement packets with specialized data flags. This can increase the probability that the peripheral device will connect with the desired central device by enabling other central devices (e.g., the user's mobile phone) to ignore these advertisement packets.

An example method of initiating a communication session with a wireless peripheral device, according to the description, comprises wirelessly broadcasting, with the peripheral device, a first set of advertising packets, receiving, at the peripheral device from a first central device, a request to initiate a first communication session, and causing the peripheral device to establish and complete the first communication session with the first central device. The method further comprises wirelessly broadcasting, with the peripheral device, a second set of advertising packets, where each advertising packet of the second set of advertising packets comprises a data flag not included in any advertising packet of the first set of advertising packets, and the data flag comprises an indication of a type of device to initiate a communication session with the peripheral device.

Embodiments of the example method may include one or more the following features. The method may comprise determining that an advertising interval has elapsed, and in response to the determination, terminating the wireless broadcast of the second set of advertising packets. The method may comprise receiving, at the peripheral device from a second central device, a request to initiate a second communication session, causing the peripheral device to establish and complete the second communication session with the second central device, receiving, at the peripheral device, an instruction from the second central device with which the peripheral device communicated, and in response to the receiving the instruction, terminating the wireless broadcast of the second set of advertising packets. The peripheral device may wirelessly broadcast the first set of advertising packets at a first power level and may wirelessly broadcast the second set of advertising packets at a second power level lower than the first power level. The first set of advertising packets and the second set of advertising packets. Maybe wirelessly broadcast using Bluetooth Low Energy (BLE). For each advertising packet of the second set of advertising packets, the data flag may comprise a bit value within a manufacturing data field of each respective advertising packet. Wirelessly broadcasting the first set of advertising packets may be in response to a triggering event. The triggering event may comprise receiving a user input at the peripheral device.

An example device, according to the description, comprises a wireless communication interface, a memory, and a processing unit communicatively coupled with the memory and the wireless communication interface. The processing unit is configured to wirelessly broadcast, via the wireless communication interface, a first set of advertising packets, receive, via the wireless communication interface from a first central device, a request to initiate a first communication session, and establish and complete the first communication session with the first central device via the wireless communication interface. The processing unit is further configured to wirelessly broadcast, via the wireless communication interface, a second set of advertising packets, where each advertising packet of the second set of advertising packets comprises a data flag not included in any advertising packet of the first set of advertising packets, and the data flag comprises an indication of a type of device to initiate a communication session with the device.

Embodiments of the device may comprise one or more of the following features. The processing unit may be further configured to determine that an advertising interval has elapsed, and, in response to the determination, terminate the wireless broadcast of the second set of advertising packets. The processing unit may be further configured to receive, via the wireless communication interface from a second central device, a request to initiate a second communication session, establish and complete the second communication session with the second central device, receive, via the wireless communication interface at the device, an instruction from the second central device with which the device communicated, and in response to receiving the instruction, terminate the wireless broadcast of the second set of advertising packets. The processing unit may be configured to wirelessly broadcast the first set of advertising packets at a first power level and wirelessly broadcast the second set of advertising packets at a second power level lower than the first power level. The processing unit may be configured to wirelessly broadcast the first set of advertising packets and the second set of advertising packets are using Bluetooth Low Energy (BLE). The processing unit may be configured to cause the data flag of each advertising packet of the second set of advertising packets to include a bit value within a manufacturing data field of each respective advertising packet. The processing unit may be configured to wirelessly broadcast the first set of advertising packets in response to a triggering event. The device may further comprise an input device, wherein the triggering event comprises receiving a user input via the input device.

An apparatus, according to the description, comprises means for wirelessly broadcasting a first set of advertising packets, means for receiving, from a first central device, a request to initiate a first communication session, and means for establishing and completing the first communication session with the first central device. The apparatus further comprises means for wirelessly broadcasting a second set of advertising packets, where each advertising packet of the second set of advertising packets comprises a data flag not included in any advertising packet of the first set of advertising packets, and the data flag comprises an indication of a type of device to initiate a communication session with the apparatus.

Embodiments of the apparatus may further comprise one or more of the following features. The apparatus may further comprise, for example, means for determining that an advertising interval has elapsed, and means for terminating the wireless broadcast of the second set of advertising packets in response to the determination. The apparatus may further comprise means for receiving, from a second central device, a request to initiate a second communication session, means for establishing and completing the second communication session with the second central device, means for receiving an instruction from the second central device with which the apparatus communicated, and means for terminating the wireless broadcast of the second set of advertising packets in response to receiving the instruction. The apparatus may further comprise means for wirelessly broadcasting the first set of advertising packets at a first power level and wirelessly broadcasting the second set of advertising packets at a second power level lower than the first power level. The apparatus may further comprise means for wirelessly broadcasting the first set of advertising packets and the second set of advertising packets using Bluetooth Low Energy (BLE). The apparatus may further comprise means for including, in the data flag for each advertising packet of the second set of advertising packets, a bit value within a manufacturing data field of each respective advertising packet. The apparatus may further comprise means for wirelessly broadcasting the first set of advertising packets in response to a triggering event. The apparatus may further comprise means for detecting the triggering event, wherein the means for detecting the triggering event include means for receiving a user input.

An example non-transitory computer-readable medium, according to the description, comprises instructions embedded thereon for initiating a communication session with a wireless peripheral device. The instructions include computer code for causing a peripheral device to wirelessly broadcast a first set of advertising packets, receive, from a first central device, a request to initiate a first communication session, and establish and complete the first communication session with the first central device. The instructions further include computer code for causing a peripheral device to wirelessly broadcast a second set of advertising packets, where each advertising packet of the second set of advertising packets comprises a data flag not included in any advertising packet of the first set of advertising packets, and the data flag comprises an indication of a type of device to initiate a communication session with the peripheral device.

Embodiments of the non-transitory computer-readable medium may comprise one or more of the following features. The instructions may further include computer code for causing a peripheral device to determine that an advertising interval has elapsed and terminate the wireless broadcast of the second set of advertising packets in response to the determination. The instructions may further include computer code for causing a peripheral device to receive, from a second central device, a request to initiate a second communication session, cause the peripheral device to establish and complete the second communication session with the second central device, receive an instruction from the second central device with which the peripheral device communicated, and in response to receiving the instruction, terminate the wireless broadcast of the second set of advertising packets. The instructions may further include computer code for causing a peripheral device to wirelessly broadcast the first set of advertising packets at a first power level and wirelessly broadcast the second set of advertising packets at a second power level lower than the first power level. The instructions may further include computer code for causing a peripheral device to wirelessly broadcast the first set of advertising packets and the second set of advertising packets using Bluetooth Low Energy (BLE). The instructions may further include computer code for causing a peripheral device to wirelessly broadcast the first set of advertising packets in response to a triggering event.

BRIEF DESCRIPTION OF DRAWINGS

Non-limiting and non-exhaustive aspects are described with reference to the following figures, wherein like reference numerals refer to like parts throughout the various figures unless otherwise specified.

DETAILED DESCRIPTION

Several illustrative embodiments are described below with respect to the accompanying drawings, which form a part hereof. The ensuing description provides embodiment(s) only, and is not intended to limit the scope, applicability or configuration of the disclosure. Rather, the ensuing description of the embodiment(s) will provide those skilled in the art with an enabling description for implementing an embodiment. It is understood that various changes may be made in the function and arrangement of elements without departing from the spirit and scope of this disclosure.

For example, techniques described herein are directed toward enabling a Bluetooth Low Energy (BLE) peripheral device to connect with multiple central devices. However, it can be noted that embodiments are not so limited. While particular embodiments, in which one or more aspects of the disclosure may be implemented, are described below, other embodiments may be used and various modifications may be made without departing from the scope of the disclosure or the spirit of the appended claims. For instance, techniques described herein may be applied to a variety of device types, applications, and/or wireless technologies.

In recent years, medical devices (such as inhalers, pill packs, injector pens, skin patches, wearable monitors and sensors, etc.) have become modified with electronic modules in order to track and report related data such as date and time of usage, sensor data, method of use, etc. These "smart" medical devices can then relay this data wirelessly to a central device, such as a mobile phone of a user. The mobile device can then provide an analysis of the data and/or other information via a display, using, for example a software application to process the data and/or provide user interactivity. To communicate the data from the medical device to the mobile device, the medical device and mobile device may establish a wireless connection using a technology, such as BLE, that creates a master/slave relationship where the mobile device is the master (also known as the "central device"), and the medical device is the slave (also known as the "peripheral device").

Figure 1:
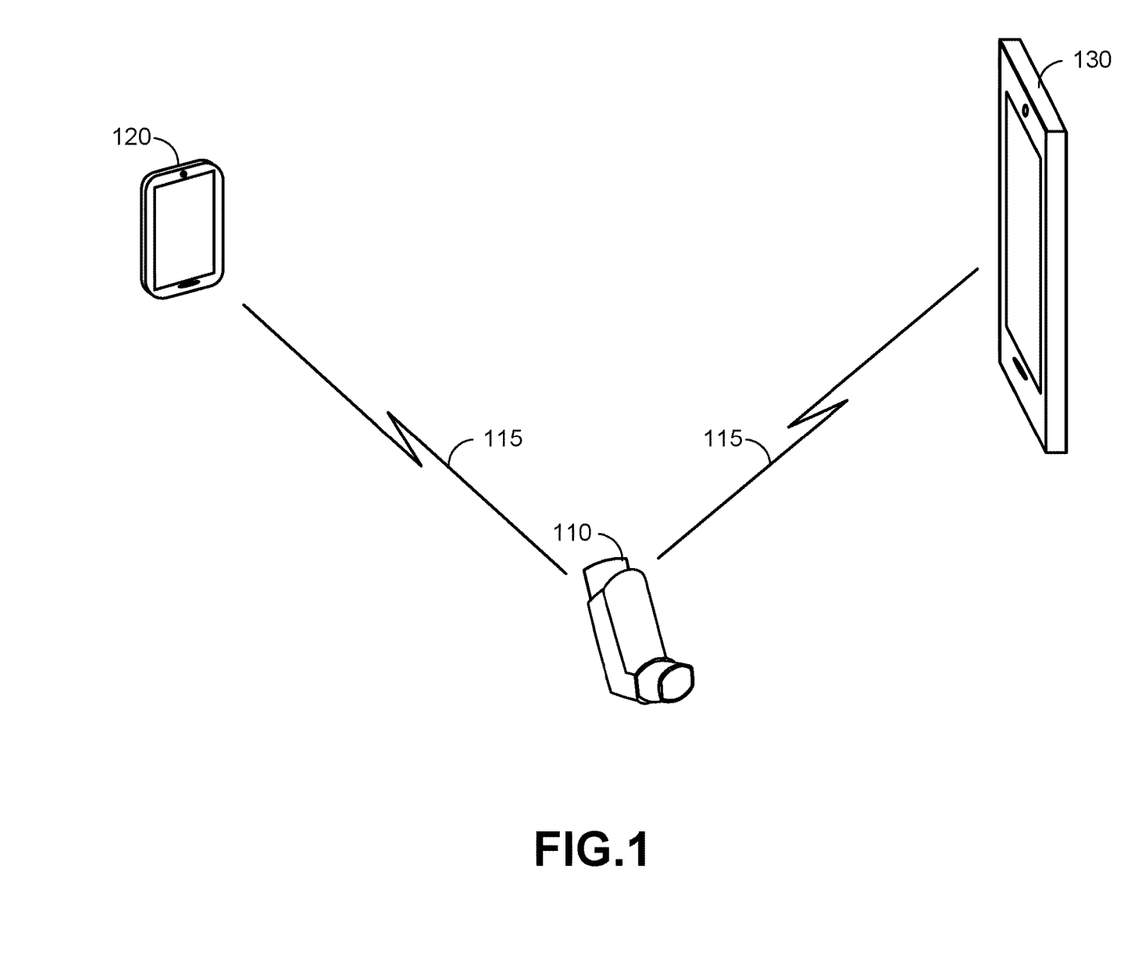
FIG. 1 is a simplified illustration of a scenario in which multiple central devices may attempt to access a peripheral device.

This relationship, however, can cause difficulties in some situations where multiple central devices are involved. FIG. 1 is a simplified illustration of such a scenario. Here, a peripheral device 110 broadcasts wireless radio frequency (RF) signals 115 to a first central device 120 and a second central device 130. Of course, although the devices depicted in FIG. 1 are illustrated as being specific types of devices (the peripheral device 110 is a smart inhaler, the first central device 120 is a mobile phone, and the second central device 130 is a tablet), a person of ordinary skill in the art will appreciate that the peripheral device 110 and/or first and second central devices 120, 130 may comprise different types of devices in different scenarios.

BLE protocol and process requires the peripheral device 110 to transmit advertising packets via RF signals 115 to indicate that it is available to receive a connection request. These advertising packets are used for other purposes as well. Whenever the peripheral device 115 produces advertising packets, any central device (paired or not), can connect to the peripheral device. When the user experience requires more than one central device to connect, there is no mechanism in the standard which would allow the second device to connect reliably.

Such a user experience is depicted in FIG. 1. Here, a user of a peripheral device 110 (e.g., a smart medical device) may also own and use a first central device 120 (e.g., a mobile phone) with which the peripheral device 110 may regularly communicate. For instance, the first central device 120 may execute a software application (or "app") enabling the first central device to communicate with the peripheral device 110, for data gathering and/or other purposes. Because of the medical nature of the peripheral device 110, the user may take the peripheral device 110 to a healthcare provider (e.g., hospital, health clinic, doctor's office, etc.) to transmit the data obtained by the peripheral device 110 to the second central device 130 of the healthcare provider for evaluation by the healthcare provider. Here, the second central device 130 may comprise a tablet (as illustrated) or other wireless device operated by the healthcare provider. Because the peripheral device 110 broadcasts advertising packets that can be detected and responded to by both the first central device 120 and the second central device 130, there is a likelihood that the first central device 120 will establish a connection with the peripheral device 110, preventing the second central device 130 from establishing a connection.

Techniques provided herein are directed to enabling the second central device 130 to have a much higher probability to connect to the peripheral device 110.

According to some embodiments, the peripheral device 110 can broadcast low-power advertising packets detectable only within a threshold distance from the peripheral device 110, and the second central device 130 can be brought in proximity to the peripheral device 110 within the threshold distance, enabling the second central device 130 to respond to the low-power advertising. (In BLE, for example, the threshold distance within which low-power advertising packets may be detected is approximately 30 cm.) According to embodiments, the peripheral device 110 can change its behavior without requiring any special behavior in the second central device 130 or first central device 120 (e.g., through the use of a software application). This can be helpful as it is often challenging to encourage a central device to change behavior when it comes to advertising and connection activities.

Figure 2:
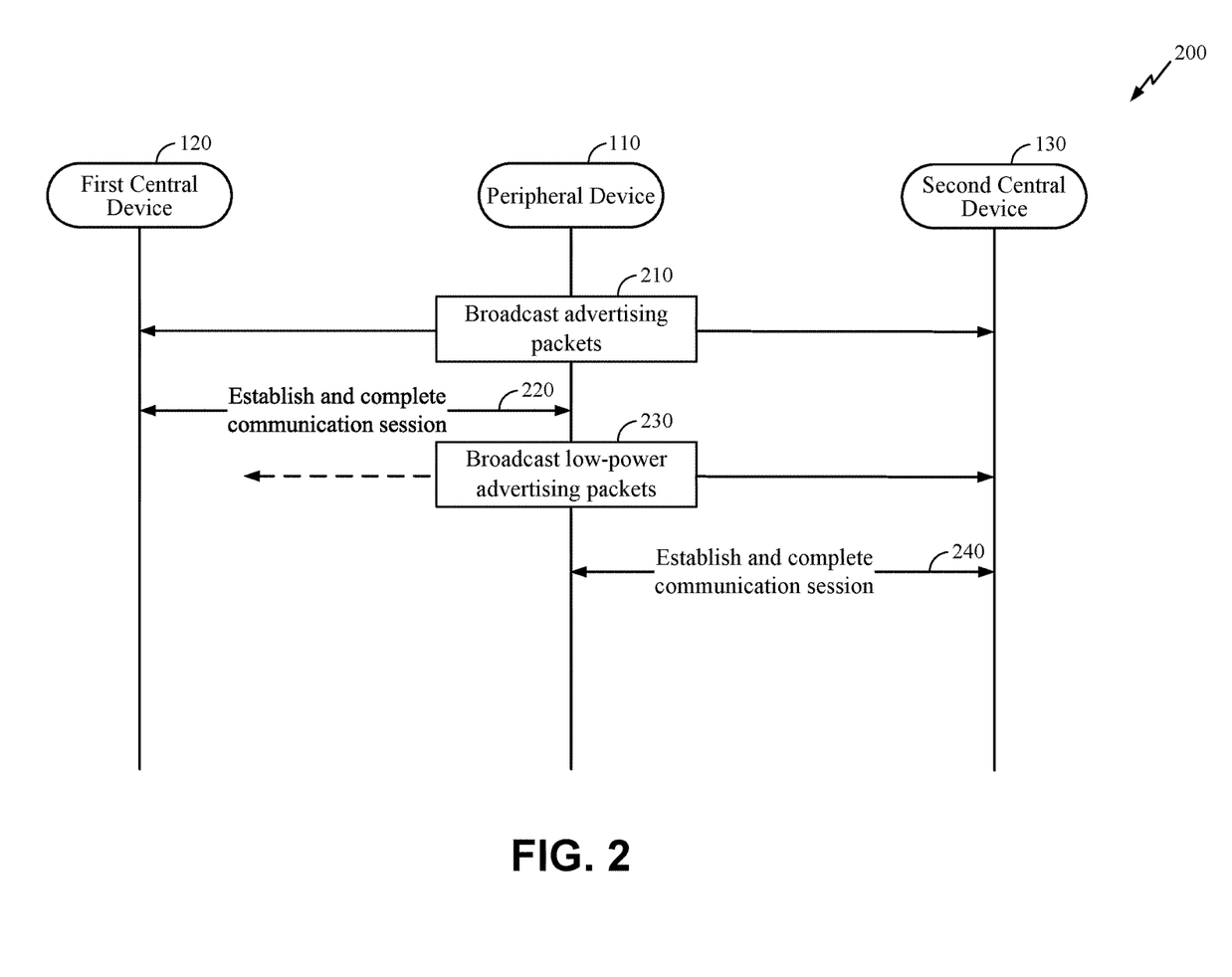
FIG. 2 is a call flow diagram illustrating a method of improving connectivity to a peripheral device when being accessed by multiple central devices, according to one embodiment.

FIG. 2 is a call flow diagram 200 illustrating a method of improving connectivity to a peripheral device 110 when being accessed by multiple central devices 120, 130, according to an embodiment that uses low-power advertising packets as described above. Here, the peripheral device 110, first central device 120, and second central device 130, can correspond with the devices illustrated in FIG. 1. And, as indicated above, various embodiments may include any of a variety of types of devices (other than those shown in FIG. 1), depending on desired functionality. Means for performing the functionality illustrated in FIG. 2 may comprise hardware and/or software components, such as the components of a computing device 500 illustrated in FIG. 5 and described below.

The method can begin at block 210, where the peripheral device 110 broadcasts advertising packets. This function may be triggered in any of a variety of ways, depending on desired functionality. In some embodiments, for example, the peripheral device 110 may have a button and/or other input mechanism that may be pressed (or otherwise activated) by a user to cause the peripheral device 110 to broadcasts advertising packets. In some embodiments, the peripheral device 110 may be configured to broadcast advertising packets periodically during an "advertising interval." Thus, triggers may be time and/or action based. The advertising packets may be broadcast in accordance with governing standards and/or protocols, and may be sent on one or more communication channels/frequencies, depending on the wireless technology utilized by the peripheral device 110.

At action 220, the first central device 120, establishes and completes a communication session with the peripheral device 110. Here, the first central device 120 may detect and advertising packet broadcast by the peripheral device 110 at block 210 before the second central device 130 is able to detect a advertising packet because, for example, the first central device 120 may be scanning a particular communication channel/frequency on which an advertising packet is broadcast when the second central device 130 may be scanning a different communication channel/frequency. (Various other scenarios may cause the first central device 120 to establish the communication session with the peripheral device 110 prior to the second central device 130.) In any case, after collecting data from the peripheral device 110, the first central device 120 can terminate the communication session and enable the peripheral device 110 to establish communication sessions with another device.

At block 230, the peripheral device 110 broadcasts low-power advertising packets. The low-power transmission of advertising packets can limit the detectability of the advertising packets to within a threshold distance of the peripheral device 110. Therefore, by ensuring that the second central device 130 is within the threshold distance (and the first central device 120 is beyond the threshold distance), a user can ensure that the second central device 130 is able to detect the advertising packets of the peripheral device 110 and the first central device 120 is not. As a result, the second central device 130 is able to, at action 240, establish and complete a communication session with the peripheral device 110.

According to some embodiments, additional mechanisms may be implemented to help ensure peripheral device 110 is able to establish and complete a communication session at block 240. For example, some embodiments may implement techniques to help ensure the first central device 120 is at least a certain distance away from the peripheral device 110. Before the peripheral device 110 broadcasts low-power advertising packets at block 230. These techniques can include determining a distance between the peripheral device 110 and the first central device 120 by taking measurements using wireless signals (e.g., measuring received signal strength indicator (RSSI), round-trip time (RTT), and/or similar measurements), estimating relative position using motion sensors (e.g., accelerometers, gyroscopes, cameras, etc.), and the like.

Additionally or alternatively, the peripheral device 110 may adjust a power level for broadcasting advertising packets based on which device(s) respond. For instance, a peripheral device 110 may begin broadcasting advertising packets at a standard power level, waiting a certain period of time to determine whether a plurality of central devices respond, and, if so, broadcasting advertising packets at a reduced power level to determine which central devices respond. The peripheral device 110 may repeat the process of transmitting advertising packets and further reducing for these transmissions until only a single central device responds.

Depending on desired functionality, data flags may be used in addition or as an alternative to low-power advertising packets. According to some embodiments, for example, the peripheral device 110 can broadcast a packet with a flag that indicates to the second central device 130 that the advertising packet is actionable. In the meantime, the first central device 120, can ignore the packet broadcast by device 110. Packets with this flag ensure that only central devices that are in proximity, and have an actionable event upon the packet with a flag increase the probability that the second central device 130 connects, while the first central device 120 ignores the packet. This functionality is described in more detail in FIG. 3.

Figure 3:
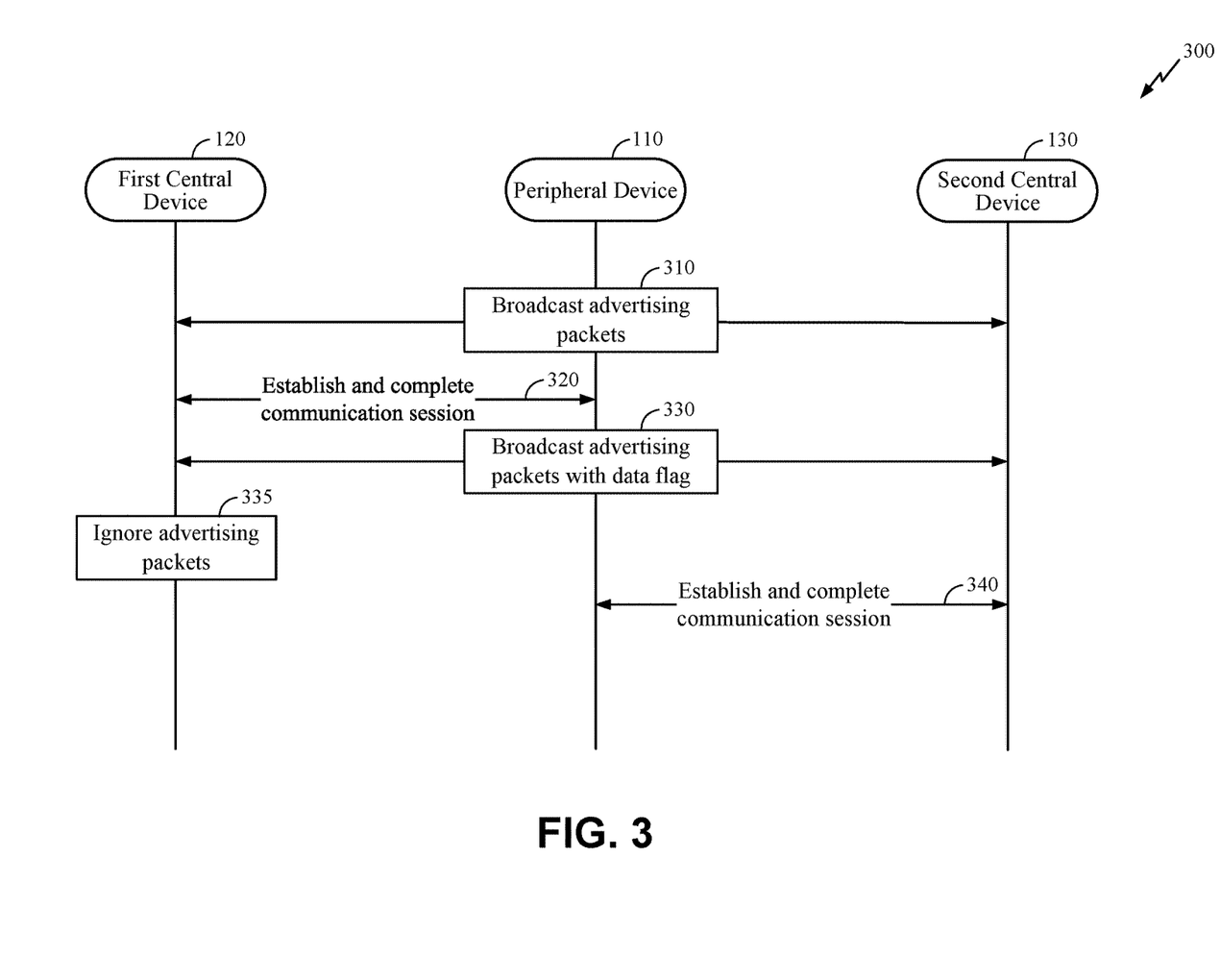
FIG. 3 is a call flow diagram illustrating a method of improving connectivity to a peripheral device when being accessed by multiple central devices, according to another embodiment.

FIG. 3 is a call flow diagram 300 illustrating another embodiment of a method for improving connectivity to a peripheral device 110 when being accessed by multiple central devices 120, 130 by utilizing data flags in advertising packets. Here, the diagram 300 is similar to the diagram 200 of FIG. 2, including a peripheral device 110, first central device 120, and a second central device 130. Additionally, the method may begin with the peripheral device 110, broadcasting advertising packets at block 310 and establishing and completing a communication session at action 320 in a manner similar to the method of FIG. 2. (Triggers for initiating the functionality performed at block 310 may also be similar to those described with regard to in FIG. 2.) The advertisement packets broadcast at block 310 and/or the communication session conducted at action 320 may be in accordance with established wireless (e.g., Bluetooth or BLE) protocol.

When the peripheral device 110 seeks to communicate with the second central device 130, it can broadcast advertising packets with a special data flag, as indicated at block 330. Here, the data flag can be an identifier that indicates the device or device type with which the peripheral device 110 wants to communicate. This flag may be a single bit of data within the advertising packet or may comprise a plurality of bits, which may be included in one or more data fields of the advertising packet, such as the manufacturing data field (including subfields such as model ID and/or Universally Unique ID (UUID)), service ID, field name, etc. In some embodiments, may include a flag that indicates a specific device to connect with. For example, the advertising packet broadcast by the peripheral device 110 at block 330 may include an identifier (e.g., UUID) of the second central device 130.

At block 335, the first central device 120 receives, but ignores, the advertising packets broadcast by the peripheral device 110. That is, the first central device 120 may detect the flag in the advertising packets broadcast at block 330 and make no attempts to establish a communication session with the peripheral device 110. This functionality may be implemented by the first central device 120 via firmware and/or a software application executed by the first central device 120. This can enable the second central device 130 to establish and complete a communication session with the peripheral device 110 at action 340.

This basic functionality may vary, depending on desired functionality. In the embodiment illustrated, the first central device 120 may be configured to attempt to establish a communication session with a peripheral device 110 upon receiving advertising packets only after determining the data flag is not present in the advertising packets. The second central device 130, on the other hand, may be configured to attempt to establish a communication session with a peripheral device 110 upon receiving advertising packets, regardless of whether there is a flag. Alternatively, the second central device may only attempt to establish a communication session when determining a flag is present. (The functionality of the first central device 120 (e.g., user device) and the second central device 130 (e.g., healthcare provider's device) may be switched in some cases, depending on desired functionality.) In some embodiments, the functionality at block 330 may include an advertisement burst: broadcasting a large number of advertising packets with the data flag in a short period of time, which may help ensure the peripheral device 110 is able to establish a communication session with the second central device 130.

Figure 4:
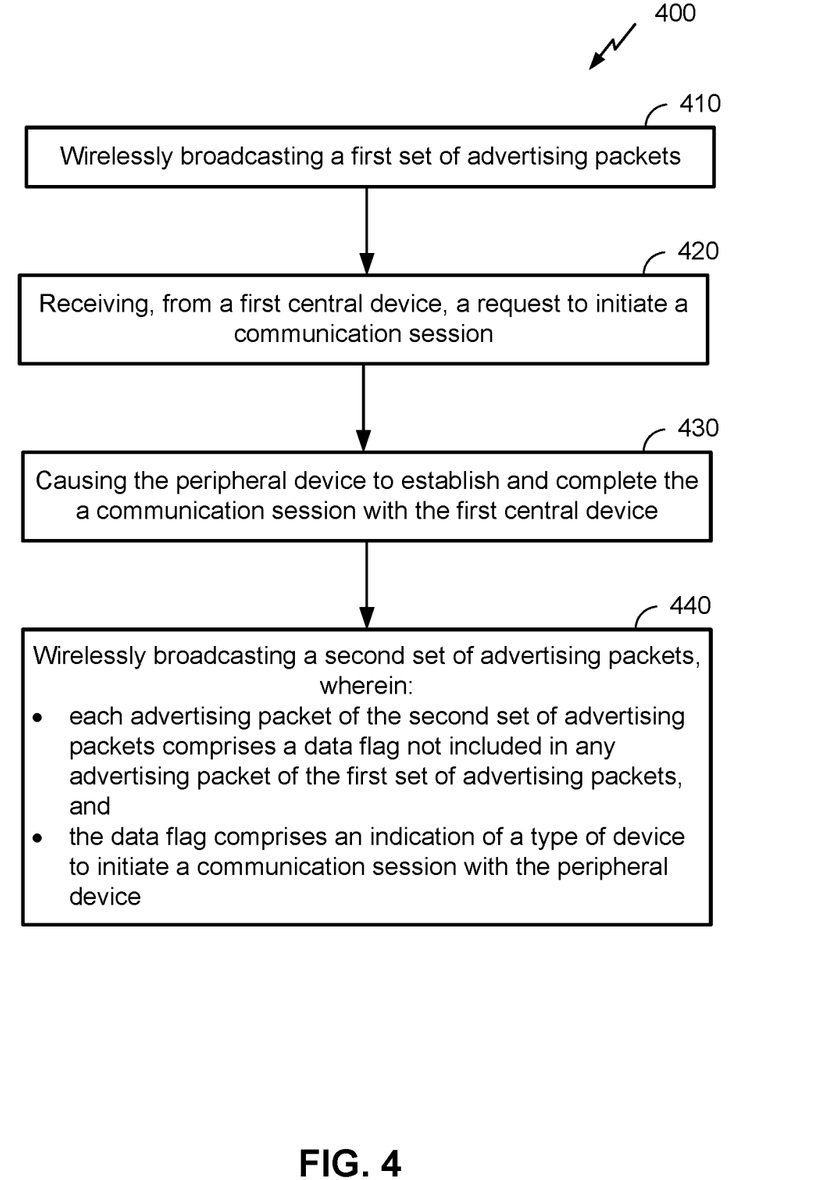
FIG. 4 is a flow diagram illustrating an example method that can be executed by a peripheral device to help ensure connectivity with multiple central devices.
Figure 5:
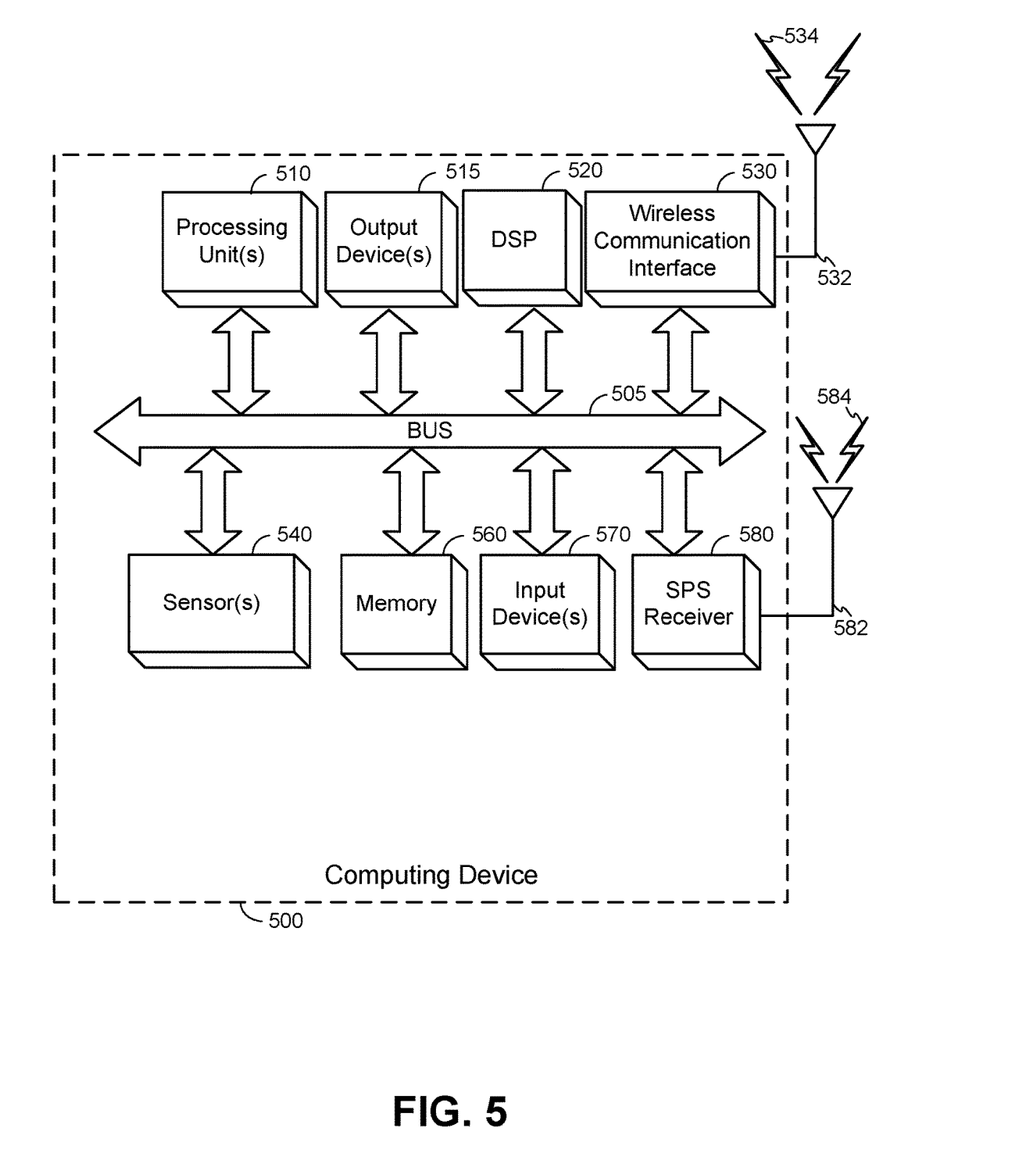
FIG. 5 is a block diagram of a computing device, according to an embodiment.

FIG. 4 is a method flow diagram illustrating an example method 400 that can be executed by a peripheral device 110 to help ensure connectivity with multiple central devices in accordance with the techniques described herein, including techniques illustrated in FIGS. 2-3 and described above. The functionality of one or more of the blocks illustrated in the method 400 can be performed by software and/or hardware components of a peripheral device 110, which may correspond to software and hardware components of a computing device 500 as illustrated in FIG. 5 and described below.

The functionality at block 410 comprises wirelessly broadcasting a first set of advertising packets. Again, this functionality may be triggered when a user presses a button or perform some other action to the peripheral device. Additionally or alternatively, other things (periodic transmissions, transmission schedules, etc.) may trigger the functionality at block 410. Here, in some embodiments, the first set of advertising packets may comprise "normal" advertisement packets, and thereby may not include a data flag and/or may be broadcast at a first power level that comprises a standard or "normal" power level. Thus, if multiple central devices are within range of the advertising packets, any one of the multiple central devices may first establish a data connection and complete a communication session with the peripheral device. Means for performing the functionality at block 410 may include one or more components of a computing device, such as a processing unit 510, wireless communication interface 530, wireless antenna, 532, bus 505, memory 560, and/or other components of the computing device 500 illustrated in FIG. 5 and described below.

The functionality of establishing a communication session from the perspective of the peripheral device is illustrated in blocks 420 and 430. At block 420, for example, the peripheral device receives a request to initiate a communication session from a first central device (which may be transmitted by the first central device in response to receiving one or more of the advertising packets at block 410). At block 430, the functionality includes causing the peripheral device to establish and complete the communication session with the first central device. Means for performing the functionality at block 420 and 430 may include one or more components of a computing device, such as a processing unit 510, wireless communication interface 530, wireless antenna, 532, bus 505, memory 560, and/or other components of the computing device 500 illustrated in FIG. 5 and described below. At block 440, the peripheral device may then broadcast a second set of advertising packets, where each advertising packet of the second set of advertising packets comprises a data flag not included in any advertising packet of the first set of advertising packets, and the data flag comprises an indication of a type of device to initiate a communication session with the peripheral device. As previously indicated, the data flag may include one or more bits of a data field within an advertising packet indicative of a device type (e.g., a healthcare provider's device), identifying the type of device for which the advertisement packets are intended. Here, the mere presence of the flag at a predetermined bit (e.g., the predetermined bit having a value of "1" rather than a "0") may be indicative of the type of device for which the advertising packets are intended. In some embodiments, where the first set of advertising packets were broadcast at a first power level, the second set of advertising packets may be broadcast at a second power level, which may be lower than the first power level, and thus may only be detected within a certain proximity of the peripheral device. As such, the likelihood that the peripheral device will establish a communication session with a central device outside of this proximity is greatly reduced. This enables a user to position the peripheral device next to a central device with which the user desires the peripheral device to communicate (and position other central devices away from the peripheral device and beyond the proximity within which the advertising packets broadcast at the second power level are detectable), to help ensure the peripheral device communicates with the desired central device. (In some embodiments, the user can then press a button or otherwise trigger the peripheral device to implement the method 400 illustrated in FIG. 4.) If the peripheral device does not communicate with a desired central device at block 430, then the peripheral device will likely be able to communicate with the desired central device after broadcasting the second set of advertising packets with the data flag at block 440. for embodiments where different power levels are used for transmitting the first set of advertising packets and the second set of advertising packets, different governing standards may dictate the available power level(s) at which advertising packets may be broadcast at blocks 410 and/or 440.

Means for performing the functionality at block 440 may include one or more components of a computing device, such as a processing unit 510, wireless communication interface 530, wireless antenna, 532, bus 505, memory 560, and/or other components of the computing device 500 illustrated in FIG. 5 and described below.

In some embodiments, the functionality of blocks 410-430 may be performed in accordance with traditional techniques of establishing and conducting a "normal" communication session before broadcasting the second set of advertising packets having a data flag. This functionality can enable normal communications between a peripheral device and the first central device, while further enabling additional communication with a second central device when needed. In instances where a peripheral device comprises a medical device, for example, a user may perform a triggering action (e.g., press a button on the medical device) to allow the medical device to establish and conduct a communication session with the user's mobile phone (a first central device). Because these types of communication sessions may occur more frequently than communications between the medical device and a healthcare provider's device (a second central device), they may be prioritized over communication sessions between the medical device and the healthcare providers device. As such, the method 400 may be used to enable the medical device to communicate with the user's mobile phone (or any device) at blocks 410-430, resorting to including data flags in advertisement packets (at block 440) when needed to communicate with the healthcare provider's device.

In some embodiments, a central device may be configured to cause the peripheral device to stop broadcasting advertising packets once a communication session has been terminated, to help preserve battery life of the peripheral device. In the example scenario illustrated in FIG. 1 above, for example, the second central device 130 may be configured to cause the peripheral device 110 to stop broadcasting advertising packets once the second central device 130 has been able to complete a communication session with the peripheral device 110 (regardless of whether the first central device 120 was able to establish a communication session with the peripheral device 110). The second central device 130 may be configured to cause the peripheral device 110 to stop broadcasting the advertising packets by wirelessly sending instructions (e.g., within the communication session or subsequent to the communication session with the peripheral device 110) to the peripheral device 110. The second central device 130 may be configured to do so by executing a software application. Other embodiments may utilize lower-level software (e.g. firmware) and/or hardware components.

In some embodiments, a peripheral device may be configured to broadcast advertising packets during an advertising interval, after which the peripheral device can enter a low-power state in which no packets are broadcast. For example, a peripheral device may be configured to perform the entire method 400 within an advertising interval, after which the peripheral device may cease to broadcast advertising packets (e.g., stop performing the functionality at block 440). In some embodiments, the peripheral device may be configured to enter and/or exit a low-power state regardless of whether it is able to establish an/or complete a communication session with first and/or second central devices, based on, for example, an advertising interval or other time threshold. This advertising interval may be governed by applicable standards and/or protocols. In some embodiments, this advertising interval maybe adjustable according to user input. In one embodiment, the advertising interval is 30 seconds, with advertising packets being broadcast every 1.28 seconds.

The types of advertising packets broadcast during each advertising interval may vary, depending on desired functionality. For example, according to some embodiments, a peripheral device may return to broadcasting a first ("normal") set of advertising packets at the beginning of each advertisement interval, regardless of what happened in the previous advertisement interval. In other embodiments, however, if the peripheral device was unable to establish and complete a communication session with a second peripheral device (in response to broadcasting a second set of advertising packets) prior to the end of an advertising interval, the peripheral device may continue to broadcast the second set of advertising packets during the subsequent advertising interval. Moreover, according to some embodiments, the peripheral device may continue to do so for a certain time period and/or number of advertising intervals before returning to normal functionality.

FIG. 5 illustrates an embodiment of a computing device 500, which can be utilized in the embodiments provided herein as, for example, a peripheral device and/or central device as described herein. FIG. 5 is meant only to provide a generalized illustration of various components, any or all of which may be included or omitted in a particular type of device as appropriate. (For example, because a peripheral device is likely less sophisticated than a central device, it may include fewer components of the computing device 500 illustrated in FIG. 5 than a central device.) It can be noted that, in some instances, components illustrated by FIG. 5 can be localized to a single physical device and/or distributed among various networked devices, which may be disposed at different physical locations. The computing device 500 may be configured to execute one or more functions of the methods described herein.

The computing device 500 is shown comprising hardware elements that can be electrically coupled via a bus 505 (or may otherwise be in communication, as appropriate). The hardware elements may include a processing unit(s) 510 which may comprise without limitation one or more general-purpose processors, one or more special-purpose processors (such as digital signal processing (DSP) chips, graphics acceleration processors, application specific integrated circuits (ASICs), and/or the like), and/or other processing structure or means, which can be configured to perform one or more of the methods described herein. As shown in FIG. 5, some embodiments may have a separate DSP 520, depending on desired functionality. The computing device 500 also may comprise one or more input devices 570, which may comprise without limitation one or more touch screens, touch pads, microphones, buttons, dials, switches, and/or the like, which may provide for user input, for example. Output devices 515 may comprise, without limitation, one or more displays, light emitting diode (LED)s, speakers, and/or the like.

The computing device 500 may also include a wireless communication interface 530, which may comprise without limitation a modem, a network card, an infrared communication device, a wireless communication device, and/or a chipset enabling communications using, for example, Bluetooth, BLE, IEEE 802.11, IEEE 802.15.4 (ZIGBEE), Wi-Fi, a WiMAX device, cellular communication, and/or the like. The wireless communication interface 530 may permit data to be communicated between a peripheral device and central device, with a network, computer system, and/or any other electronic device as described herein. The communication can be carried out via one or more wireless communication antenna(s) 532 that send and/or receive wireless signals 534.

Depending on desired functionality, the wireless communication interface 530 may comprise separate transceivers to communicate with different devices, which may be on different networks. These different data networks may comprise various network types. A wireless wide area network (WWAN), for example, may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a WiMax (IEEE 802.16), and so on. A CDMA network may implement one or more radio access technologies (RATs) such as cdma2000, Wideband-CDMA (W-CDMA), and so on. Cdma2000 includes IS-95, IS-2000, and/or IS-856 standards. A TDMA network may implement Global System for Mobile Communications (GSM), Digital Advanced Mobile Phone System (D-AMPS), or some other RAT. An OFDMA network may employ Long-Term Evolution (LTE), LTE Advanced, 5th Generation New Radio (5G NR), and so on. 5G NR, LTE, LTE Advanced, GSM, and W-CDMA are described in documents from 3rd Generation Partnership Project (3GPP). Cdma2000 is described in documents from a consortium named "3rd Generation Partnership Project 2" (3GPP2). 3GPP and 3GPP2 documents are publicly available. A wireless local area network (WLAN) may also be an IEEE 802.11x network, and a wireless personal area network (WPAN) may be a Bluetooth network, an IEEE 802.15x, or some other type of network. The techniques described herein may also be used for any combination of WWAN, WLAN and/or WPAN.

The computing device 500 can further include sensor(s) 540, which may vary depending on the type of computing device. Such sensors may comprise, without limitation, IMUS (e.g., accelerometer(s), gyroscope(s), etc.) cameras, magnetometers and/or other compasses, altimeters, microphones, proximity sensors, light sensors, and the like. In some embodiments, the sensor(s) 540 may additionally or alternatively include health-related sensors, such as sensors configured to detect a user's vital signs (and/or other health information), use of a medical product orientation and/or configuration of the product while used, etc.

Embodiments of the computing device 500 may also include a satellite positioning system (SPS) receiver 580 capable of receiving signals 584 from one or more SPS satellites using an SPS antenna 582, and being powered on and off in the manner described in the embodiments provided herein. Such positioning can be utilized to complement and/or incorporate the techniques described herein. The SPS receiver 580 can extract a position of the computing device 500, using conventional techniques, from satellite vehicles of an SPS system, such as Galileo, GLONASS, Compass, Quasi-Zenith Satellite System (QZSS) over Japan, Indian Regional Navigational Satellite System (IRNSS) over India, Beidou over China, and/or any other global navigation satellite system (GNSS). Moreover, the SPS receiver 580 can be used various augmentation systems (e.g., a Satellite Based Augmentation System (SBAS)) that may be associated with or otherwise enabled for use with one or more global and/or regional navigation satellite systems. By way of example but not limitation, an SBAS may include an augmentation system(s) that provides integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), and/or the like. Thus, as used herein an SPS may include any combination of one or more global and/or regional navigation satellite systems and/or augmentation systems, and SPS signals may include SPS, SPS-like, and/or other signals associated with such one or more SPSes.

The computing device 500 may further include and/or be in communication with a memory 560. The memory 560 may comprise, without limitation, local and/or network accessible storage, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like. This memory 560 may be used to store the images (or frames) captured by the forward-facing camera as described herein.

The memory 560 of the computing device 500 also can comprise software elements (not shown), including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the functionality discussed above might be implemented as computer code and/or instructions executable by the computing device 500 (and/or processing unit(s) 510 within a computing device 500). In an aspect, then, such code and/or instructions can be used to configure and/or adapt a general purpose computer (or other device) to perform one or more operations in accordance with the described methods. The memory 560 may therefore comprise non-transitory machine-readable media having the instructions and/or computer code embedded therein/thereon. Common forms of computer-readable media include, for example, magnetic or optical media, a RAM, a PROM, EPROM, a FLASH-EPROM, any other memory chip or cartridge, a carrier wave as described hereinafter, or any other medium from which a computer can read instructions and/or code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus, many of the elements are examples that do not limit the scope of the disclosure to those specific examples.

Reference throughout this specification to "one example", "an example", "certain examples", or "exemplary implementation" means that a particular feature, structure, or characteristic described in connection with the feature and/or example may be included in at least one feature and/or example of claimed subject matter. Thus, the appearances of the phrase "in one example", "an example", "in certain examples" or "in certain implementations" or other like phrases in various places throughout this specification are not necessarily all referring to the same feature, example, and/or limitation. Furthermore, the particular features, structures, or characteristics may be combined in one or more examples and/or features.

Some portions of the detailed description included herein are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular operations pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining" or the like refer to actions or processes of a specific apparatus, such as a special purpose computer, special purpose computing apparatus or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

The terms, "and", "or", and "and/or" as used herein may include a variety of meanings that also are expected to depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, or characteristic in the singular or may be used to describe a plurality or some other combination of features, structures or characteristics. Though, it should be noted that this is merely an illustrative example and claimed subject matter is not limited to this example.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter.

Therefore, it is intended that claimed subject matter not be limited to the particular examples disclosed, but that such claimed subject matter may also include all aspects falling within the scope of appended claims, and equivalents thereof.

What is claimed is:

1. A method of initiating a communication session with a wireless peripheral device, the method comprising:
   wirelessly broadcasting, with the peripheral device, a first set of advertising packets;
   receiving, at the peripheral device from a first central device, a request to initiate a first communication session;
   causing the peripheral device to establish and complete the first communication session with the first central device; and
   wirelessly broadcasting, with the peripheral device, a second set of advertising packets, wherein:
      each advertising packet of the second set of advertising packets comprises a data flag not included in any advertising packet of the first set of advertising packets, and
      the data flag comprises an indication of a type of device to initiate a communication session with the peripheral device.

2. The method of claim 1, further comprising:
   determining that an advertising interval has elapsed; and
   in response to the determination, terminating the wireless broadcast of the second set of advertising packets.

3. The method of claim 1, further comprising:
   receiving, at the peripheral device from a second central device, a request to initiate a second communication session;
   causing the peripheral device to establish and complete the second communication session with the second central device;
   receiving, at the peripheral device, an instruction from the second central device with which the peripheral device communicated; and
   in response to the receiving the instruction, terminating the wireless broadcast of the second set of advertising packets.

4. The method of claim 1, wherein the peripheral device wirelessly broadcasts the first set of advertising packets at a first power level and wirelessly broadcasts the second set of advertising packets at a second power level lower than the first power level.

5. The method of claim 1, wherein the first set of advertising packets and the second set of advertising packets are wirelessly broadcast using Bluetooth Low Energy (BLE).

6. The method of claim 5, wherein, for each advertising packet of the second set of advertising packets, the data flag comprises a bit value within a manufacturing data field of each respective advertising packet.

7. The method of claim 1, wherein the wirelessly broadcasting the first set of advertising packets is in response to a triggering event.

8. The method of claim 7, wherein the triggering event comprises receiving a user input at the peripheral device.

9. A device comprising:
   a wireless communication interface;
   a memory; and
   a processing unit communicatively coupled with the memory and wireless communication interface, the processing unit configured to:
      wirelessly broadcast, via the wireless communication interface, a first set of advertising packets;
      receive, via the wireless communication interface from a first central device, a request to initiate a first communication session;
      establish and complete the first communication session with the first central device via the wireless communication interface; and
      wirelessly broadcast, via the wireless communication interface, a second set of advertising packets, wherein:
         each advertising packet of the second set of advertising packets comprises a data flag not included in any advertising packet of the first set of advertising packets, and
         the data flag comprises an indication of a type of device to initiate a communication session with the device.

10. The device of claim 9, wherein the processing unit is further configured to:
    determine that an advertising interval has elapsed; and
    in response to the determination, terminate the wireless broadcast of the second set of advertising packets.

11. The device of claim 9, wherein the processing unit is further configured to:
    receive, via the wireless communication interface from a second central device, a request to initiate a second communication session;
    establish and complete the second communication session with the second central device;
    receive, via the wireless communication interface at the device, an instruction from the second central device with which the device communicated; and
    in response to receiving the instruction, terminate the wireless broadcast of the second set of advertising packets.

12. The device of claim 9, wherein the processing unit is configured to wirelessly broadcast the first set of advertising packets at a first power level and wirelessly broadcast the second set of advertising packets at a second power level lower than the first power level.

13. The device of claim 9, wherein the processing unit is configured to wirelessly broadcast the first set of advertising packets and the second set of advertising packets are using Bluetooth Low Energy (BLE).

14. The device of claim 13, wherein the processing unit is configured to cause the data flag of each advertising packet of the second set of advertising packets to include a bit value within a manufacturing data field of each respective advertising packet.

15. The device of claim 9, wherein the processing unit is configured to wirelessly broadcast the first set of advertising packets in response to a triggering event.

16. The device of claim 15, further comprising an input device, wherein the triggering event comprises receiving a user input via the input device.

17. An apparatus comprising:
means for wirelessly broadcasting a first set of advertising packets;
means for receiving, from a first central device, a request to initiate a first communication session;
means for establishing and completing the first communication session with the first central device; and
means for wirelessly broadcasting a second set of advertising packets, wherein:
   each advertising packet of the second set of advertising packets comprises a data flag not included in any advertising packet of the first set of advertising packets, and
   the data flag comprises an indication of a type of device to initiate a communication session with the apparatus.

18. The apparatus of claim 17, further comprising:
means for determining that an advertising interval has elapsed; and
means for terminating the wireless broadcast of the second set of advertising packets in response to the determination.

19. The apparatus of claim 17, further comprising:
means for receiving, from a second central device, a request to initiate a second communication session;
means for establishing and completing the second communication session with the second central device;
means for receiving an instruction from the second central device with which the apparatus communicated; and
means for terminating the wireless broadcast of the second set of advertising packets in response to receiving the instruction.

20. The apparatus of claim 17, further comprising means for wirelessly broadcasting the first set of advertising packets at a first power level and wirelessly broadcasting the second set of advertising packets at a second power level lower than the first power level.

21. The apparatus of claim 17, further comprising means for wirelessly broadcasting the first set of advertising packets and the second set of advertising packets using Bluetooth Low Energy (BLE).

22. The apparatus of claim 21, further comprising means for including, in the data flag for each advertising packet of the second set of advertising packets, a bit value within a manufacturing data field of each respective advertising packet.

23. The apparatus of claim 17, further comprising means for wirelessly broadcasting the first set of advertising packets in response to a triggering event.

24. The apparatus of claim 23, further comprising means for detecting the triggering event, wherein the means for detecting the triggering event include means for receiving a user input.

25. A non-transitory computer-readable medium having instructions embedded thereon for initiating a communication session with a wireless peripheral device, the instructions including computer code for causing a peripheral device to:
   wirelessly broadcast a first set of advertising packets;
   receive, from a first central device, a request to initiate a first communication session;
   establish and complete the first communication session with the first central device; and
   wirelessly broadcast a second set of advertising packets, wherein:
      each advertising packet of the second set of advertising packets comprises a data flag not included in any advertising packet of the first set of advertising packets, and
      the data flag comprises an indication of a type of device to initiate a communication session with the peripheral device.

26. The non-transitory computer-readable medium of claim 25, wherein the instructions further include computer code for causing a peripheral device to:
   determine that an advertising interval has elapsed; and
   terminate the wireless broadcast of the second set of advertising packets in response to the determination.

27. The non-transitory computer-readable medium of claim 25, wherein the instructions further include computer code for causing a peripheral device to:
   receive, from a second central device, a request to initiate a second communication session;
   cause the peripheral device to establish and complete the second communication session with the second central device;
   receive an instruction from the second central device with which the peripheral device communicated; and
   in response to receiving the instruction, terminate the wireless broadcast of the second set of advertising packets.

28. The non-transitory computer-readable medium of claim 25, wherein the instructions further include computer code for causing a peripheral device to wirelessly broadcast the first set of advertising packets at a first power level and wirelessly broadcast the second set of advertising packets at a second power level lower than the first power level.

29. The non-transitory computer-readable medium of claim 25, wherein the instructions further include computer code for causing a peripheral device to wirelessly broadcast the first set of advertising packets and the second set of advertising packets using Bluetooth Low Energy (BLE).

30. The non-transitory computer-readable medium of claim 25, wherein the instructions further include computer code for causing a peripheral device to wirelessly broadcast the first set of advertising packets in response to a triggering event.

* * * * *